United States Patent
Sudabattula (10) Patent No.: US 10,002,589 B2
(45) Date of Patent: Jun. 19, 2018

(54) RETAINING USER SELECTED SCREEN AREA ON USER EQUIPMENT

(71) Applicant: QUALCOMM Incorporated, San Diego, CA (US)

(72) Inventor: Samatha Sudabattula, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 14/639,001

(22) Filed: Mar. 4, 2015

(65) Prior Publication Data

US 2016/0259533 A1   Sep. 8, 2016

(51) Int. Cl.
*G06F 3/048* (2013.01)
*G09G 5/14* (2006.01)
*G09G 5/393* (2006.01)
*G06F 3/0488* (2013.01)
*G06F 3/0484* (2013.01)

(52) U.S. Cl.
CPC .............. *G09G 5/14* (2013.01); *G06F 3/0488* (2013.01); *G06F 3/04842* (2013.01); *G09G 5/393* (2013.01); *G09G 2354/00* (2013.01); *G09G 2360/08* (2013.01); *G09G 2360/121* (2013.01); *G09G 2360/127* (2013.01); *G09G 2360/18* (2013.01)

(58) Field of Classification Search
CPC .................................................. G06F 3/04842
USPC ......................................................... 715/781
See application file for complete search history.

(56) References Cited

U.S. PATENT DOCUMENTS

| 8,441,441 | B2 | 5/2013 | Tsai et al. | |
|---|---|---|---|---|
| 9,817,798 | B2* | 11/2017 | Lee | G06F 17/2247 |
| 2009/0111495 | A1 | 4/2009 | Sjolin et al. | |
| 2010/0275122 | A1 | 10/2010 | Buxton et al. | |
| 2013/0007656 | A1* | 1/2013 | Li | G06F 3/04842 715/790 |
| 2013/0014046 | A1* | 1/2013 | Watts | G01W 1/00 715/772 |
| 2013/0120286 | A1* | 5/2013 | Mai | G06F 3/04883 345/173 |
| 2013/0177295 | A1 | 7/2013 | Cath | |
| 2014/0201662 | A1* | 7/2014 | Liu | G06F 3/0486 715/769 |
| 2014/0304715 | A1 | 10/2014 | Park et al. | |
| 2015/0062051 | A1* | 3/2015 | Wang | G06F 3/0488 345/173 |

* cited by examiner

*Primary Examiner* — William Titcomb
(74) *Attorney, Agent, or Firm* — Arent Fox, LLP (57) ABSTRACT

A method, an apparatus, and a computer program product are provided. The apparatus may be a UE. The UE has a screen display. The UE displays a first image of a first application on the screen display. The UE receives a selection of a first area of the screen display. The UE retains a first image section of the first image displayed in the first area. The UE receives a second image of a second application. The UE displays the first image section on the screen display at a second area of the screen display. The UE displays the second image in areas of the screen display other than the second area.

19 Claims, 6 Drawing Sheets

RETAINING USER SELECTED SCREEN AREA ON USER EQUIPMENT

BACKGROUND

Field

The present disclosure relates generally to a user equipment (UE), and more particularly, to techniques of retaining a user selected screen area on a UE irrespective of a currently active application.

Background

Some UEs such as smart mobile phones only display an active user interface on the screen. In other words, the single active user interface displayed may occupy the entire screen of a UE. The UE may allow a user to switch between applications. Thus, the user may access user interfaces of different applications one at a time. There is a need to provide more flexibility to the user.

SUMMARY

In an aspect of the disclosure, a method, a computer program product, and an apparatus are provided. The apparatus may be a UE. The UE has a screen display. The UE displays a first image of a first application on the screen display. The UE receives a selection of a first area of the screen display. The UE retains a first image section of the first image displayed in the first area. The UE receives a second image of a second application. The UE displays the first image section on the screen display at a second area of the screen display. The UE displays the second image in areas of the screen display other than the second area.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Apparatuses and methods will be described in the following detailed description and may be illustrated in the accompanying drawings by various blocks, modules, components, circuits, steps, processes, algorithms, elements, etc.

Several aspects of a UE will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

A UE may be configured to allow a user to specify a particular selection of the screen area that will not be refreshed and that will be retained to be visible irrespective of the currently active application. Particularly, a UE may be configured to allow a user to select a screen area (e.g., based on width and length) that should always stay on top irrespective of the currently active application. Further, the UE may be configured to allow the user to deselect the same area that was selected before. Thus, the currently active application reappears completely on the screen of the UE.

In one example, when a user selects a screen area, the UE obtains the coordinates of the selected screen area. If the user moves a copy of the selected screen area to a different location on the screen of the UE, the UE obtains new coordinates of the selected screen are at the new location. The image in the selected screen area is retained. When the UE switches to a different active application, the UE still displays the retained image at the screen area specified by the coordinates. The rest of the screen is refreshed to reflect the currently active application. The UE at a later point may, e.g., at the user's request, release the retained image. Subsequently, the UE refreshes its screen to display the currently active application completely.

Figure 1:
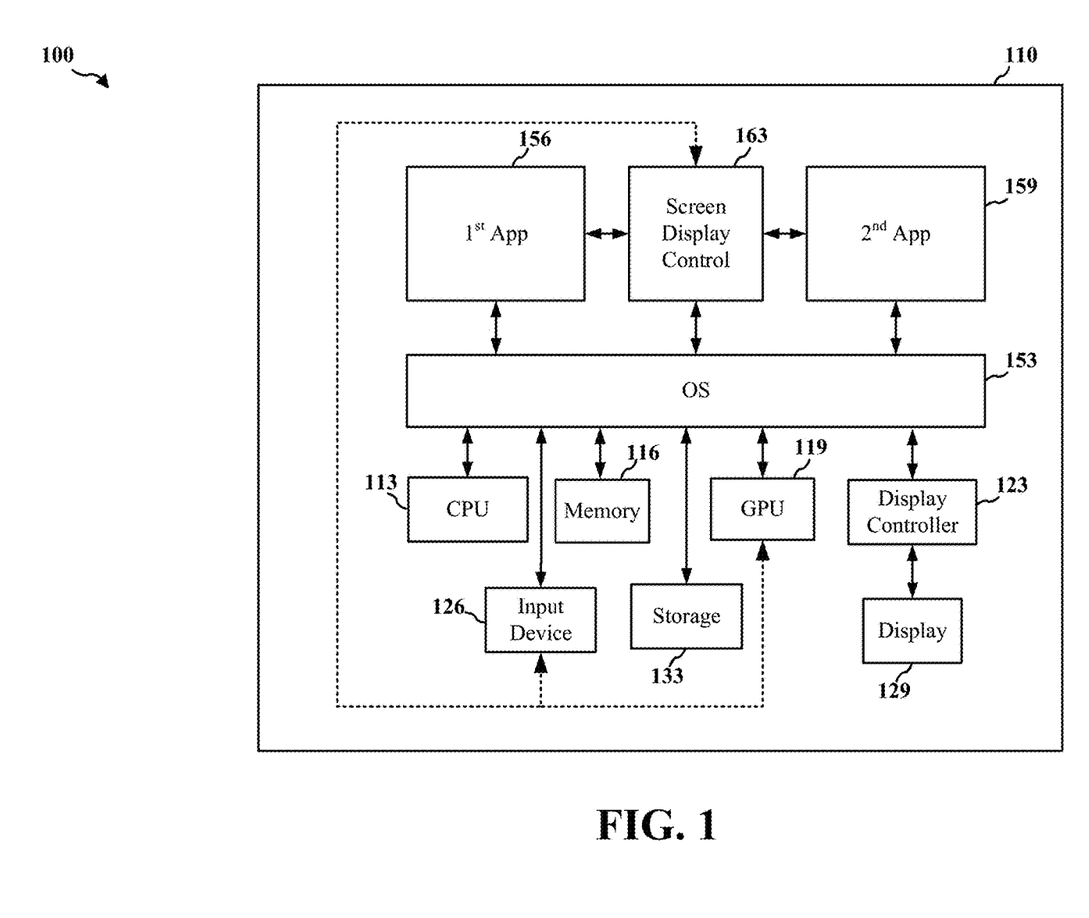
FIG. 1 is a diagram illustrating functional components of a UE.

FIG. 1 is a diagram 100 illustrating functional components of a UE. Examples of UEs include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. A UE may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

An exemplary UE 110 has, among other components, a CPU 113, a memory 116, a GPU 119, a display controller 123, an input device 126, a display device 129, and a storage 133. The GPU 119 may be a specialized electronic circuit designed to rapidly manipulate and alter memory to accelerate the creation of images in a frame buffer intended for output to a display. The display controller 123 may be an integrated circuit that is responsible for the production of a video signal. The memory 116 is a volatile data storage device such as a RAM. The storage 133 is a non-volatile data storage device such as a flash memory or a solid-state memory device. The storage 133 may be a distributed memory device with separate data stores coupled to the CPU 113. An OS 153 (or other system management software) manages and allocates the resources of the components of the UE 110.

One or more applications may run on the OS 153. As an illustrative example and for clarity, FIG. 1 shows a first application 156 and a second application 159 running on the OS 153. The UE 110 also has a screen display control module 163 in communication with the first application 156, the second application 159, the display controller 123, and the GPU 119. In one configuration, the screen display control module 163 may be a module that runs on top or within the OS 153, utilizing the CPU 113 and the memory 116. Thus, the screen display control module 163 may communicate with the first application 156, the second application 159, the GPU 119, and the input device 126 through the OS 153. In another configuration, the screen display control module 163 may has its own processing unit and memory unit and may communicate with the first application 156, the second application 159, the GPU 119, and the input device 126 through a system bus. The first application 156 and the second application 159 each may perform various functions and may instruct the GPU 119 to generate one or more a screen display image.

Figure 2:
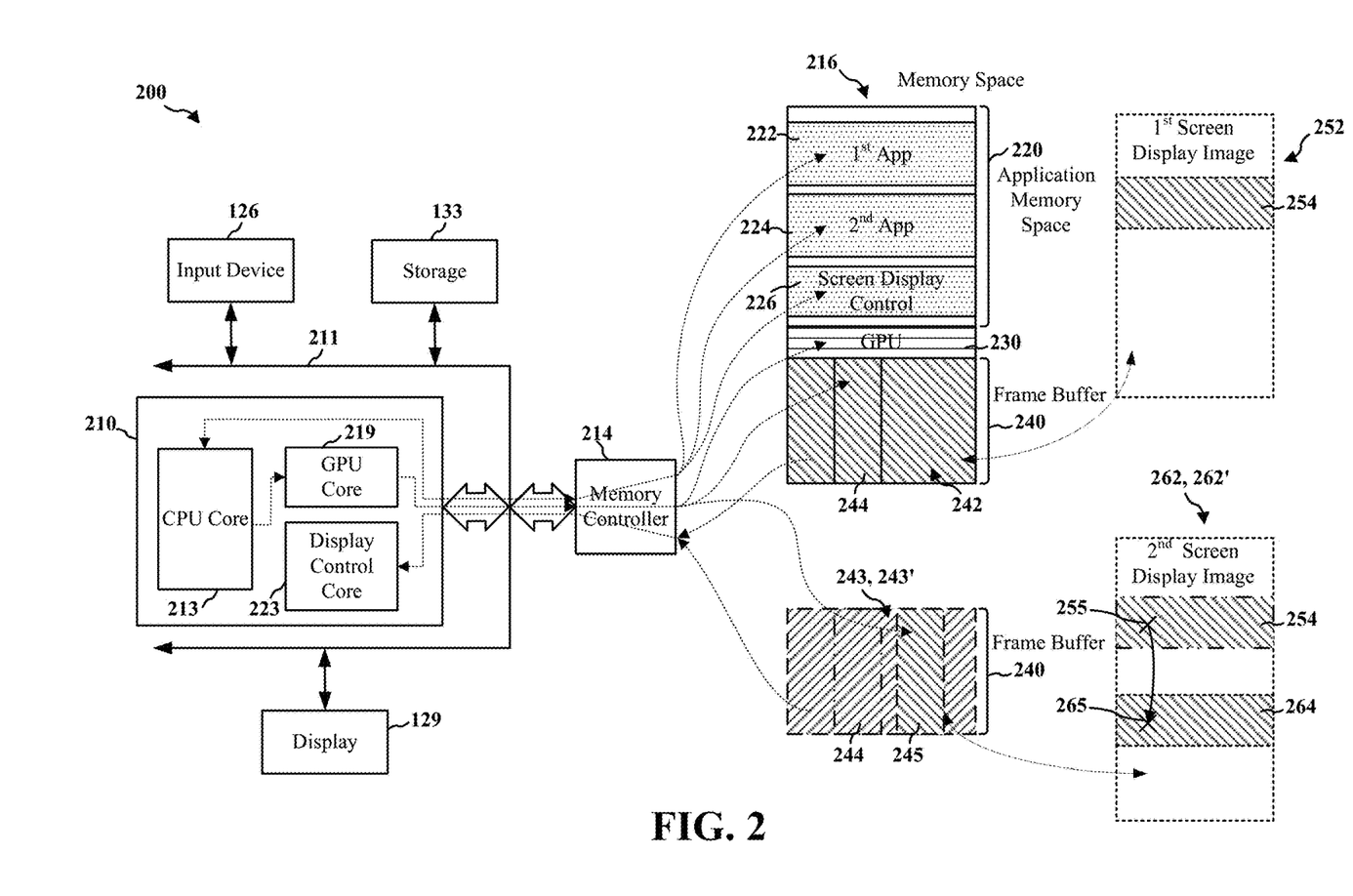
FIG. 2 is a diagram illustrating an exemplary hardware implementation of a UE.

FIG. 2 is a diagram 200 illustrating an exemplary hardware implementation of a UE. In this example, the CPU 113, the GPU 119, the display controller 123, and the functional components described in FIG. 1 may be implemented by a single processor 210 having a CPU core 213, a GPU core 219, and a display control core 223. The memory 116 includes a memory controller 214 and a memory space 216. The memory space 216 may include an application memory space 220, a GPU memory space 230, and a frame buffer 240. The memory controller 214 manages the memory space 216. The processor 210 (which has the CPU core 213, the GPU core 219, and the display control core 223), the memory 116, the input device 126, the storage 133, the display device 129 may communicate through a system bus 211.

When the system of the UE 110 starts, the OS 153, e.g., based on user requests, may instruct the CPU core 213 to load the first application 156, the second application 159, and the screen display control module 163 from the storage 133 into the memory 116. Particularly, the first application 156, the second application 159, and the screen display control module 163 may be loaded into a first memory space 222, a second memory space 224, and a third memory space 226 of the application memory space 220, respectively.

The first application 156, executed at the CPU core 213, may generate a first screen display image 252. The first application 156 instructs the GPU core 219 to generate a corresponding first image frame 242 for displaying the first screen display image 252 on the display device 129. The GPU core 219 utilizes the GPU memory space 230 to process the instructions and data received from the first application 156 and generates the first image frame 242. The GPU core 219 writes the first image frame 242 to the frame buffer 240. The display control core 223 retrieves the first image frame 242 from the frame buffer 240 and generates display signals for the first image frame 242. The display control core 223 then transmits the display signals to the display device 129, which accordingly displays the first screen display image 252 on the display device 129. The second application 159 may similarly show a screen display image on the display device 129. In certain configurations, the screen display images generated by the first application 156 and the second application 159 each solely occupy the entire screen of the display device 129. In other words, the display device 129 may only display a screen display image from one application at a time, and cannot display two screen display images from two different applications at the same time (such as in a screen-share mode). Further, the first application 156, the second application 159, and the screen display control module 163 may receive user inputs through the input device 126.

As will be described supra, the screen display control module 163 may provide, among other functions, an image retain function, an image display function, and an image release function. The screen display control module 163 may provide an application program interface (API), through which the applications 156, 159 may call the functions of the screen display control module 163. The screen display control module 163 may provide a user interface through which a user may call the functions and submit function parameters through the input device 126.

The screen display control module 163 may provide the image retain function, which retains an image section of a screen display image. As described supra, the first application 156 generates the first screen display image 252 and instructs the GPU core 219 to write the first image frame 242 to the frame buffer 240 in order to display the first screen display image 252 on the display device 129.

In one technique, the screen display control module 163 receives coordinates as parameters from another application (e.g., the first application 156) calling the image retain function through the API provided by the screen display control module 163. The coordinates specify a first area 254 of the first screen display image 252. The first area 254 includes the image section of the first screen display image 252 to be retained by the screen display control module 163. For example, the first application 156 may call the image retain function with a first set of coordinates specifying the first area 254 to request the screen display control module 163 to retain the image section at the first area 254 of the first screen display image 252.

In another technique, instead of receiving first set of coordinates from another application, the screen display control module 163 may receive a user input specifying first set of coordinates through the input device 126. For example, the input device 126 may be a touch screen. A user may draw the first area 254 on the touch screen. Accordingly, the input device 126 may send a first set of coordinates corresponding to the first area 254 drawn by the user to the screen display control module 163. Based on the first set of coordinates, the screen display control module 163 may determine the first area 254.

The image section to be retained (i.e., the image section at the first area 254 of the first screen display image 252) corresponds to pixel data stored in a first frame buffer memory space 244 of the frame buffer 240. The screen display control module 163 and/or the GPU core 219 may keep references or records of the memory addresses of the first frame buffer memory space 244 in the third memory space 226. The screen display control module 163, when performing the image retain function, may communicate with the GPU core 219 and retrieve the pixel data stored in the first frame buffer memory space 244. The screen display control module 163 may store the pixel data and the first set of coordinates in the third memory space 226.

Further, the screen display control module 163 may provide the image display function, which displays on the display device 129 an image section retained through the image retain function. In one configuration, after the image display function is called without parameters, each time the GPU core 219 refreshes the frame buffer 240 to write a second image frame 243 representing a second screen display image 262, the screen display control module 163 may use the pixel data and the first set of coordinates stored in the third memory space 226 and instruct the GPU core 219 to write the pixel data at the same first frame buffer memory space 244. For example, the second application 159 may generate the second screen display image 262 and may instruct the GPU core 219 to generate the second image frame 243 representing the second screen display image 262. In other words, without being manipulated by image display function of the screen display control module 163, the GPU core 219 writes the second image frame 243 to the frame buffer 240. The display control core 223 retrieves the pixel data of the second image frame 243 from the frame buffer 240 and display the second screen display image 262 at the display device 129.

In contrast, when the image display function is called, the screen display control module 163 may instruct the GPU core 219 to replace the pixel data of the second image frame 243 that should be written in the first frame buffer memory space 244 with the pixel data corresponding to the retained image section. The frame buffer 240 accordingly stores such a modified second image frame 243'. The display control core 223 subsequently retrieves the pixel data of the modified second image frame 243' from the frame buffer 240 and shows a modified second screen display image 262' at the display device 129. The first area 254 of the modified second screen display image 262' is the retained image section (i.e., the image section at the first area 254 of the first screen display image 252). The image sections at other areas of the modified second screen display image 262' are the image sections at the corresponding areas of the second screen display image 262. By doing so, the retained image section is always displayed at the first area 254 of a screen display image generated by one or more applications of the UE 110, while the screen display image may change frequently as instructed by the one or more applications. Therefore, a user may perceive that the retained image section is always on top of each of the screen display images shown at the display device 129.

In another configuration, the screen display control module 163 may be called with a second set of coordinates as parameters. The second set of coordinates specifies a second area 264 of the second screen display image 262. In one technique, the second application 159 (or any other applications) may, when calling the image display function through the API, provide the second set of coordinates to the screen display control module 163 to instruct the screen display control module 163 where to display the retained image section. Based on the second set of coordinates, the screen display control module 163 can determine the second area 264. In another technique, the screen display control module 163 may receive a user input that indicates the second area 264. For example, after the user drew the first area 254 at the first screen display image 252. The user may point to a first location 255 in the first area 254 and drag the point to the second location 265. Based on the displacement between the first location 255 and the second location 265, the screen display control module 163 can determine the second set of coordinates of the second area 264 for displaying the retained image section. Further, the screen display control module 163 may display the borders of the second area 264 on the display device 129 and allows the user to adjust the shape, size, and orientation of the second area 264. For example, the screen display control module 163 may allow a user to expand or reduce the second area 264 in order to increase or decrease the size of the retained image section to be displayed. The screen display control module 163 accordingly determines the second set of coordinates for the adjusted second area 264.

After obtaining the second set of coordinates for the second area 264, each time the GPU core 219 refreshes the frame buffer 240 to write a second image frame 243 representing a second screen display image 262, the screen display control module 163 sends the pixel data of the retained image section and the second set of coordinates to the GPU core 219 and instructs the GPU core 219 to generate pixel data for displaying the retained image section at the second area 264. If the second area 264 is the same shape, size, and orientation as the first area 254, the GPU core 219 may directly use the pixel data of the retained image section received from the screen display control module 163 as the pixel data for second area 264 without regenerating the pixel data. In other words, the GPU core 219 may only need to regenerate the pixel data for the second area 264 with adjusted shape, size, or orientation.

The GPU core 219 writes the pixel data at a second frame buffer memory space 245 that corresponds to the second area 264. The screen display control module 163 and/or the GPU core 219 may keep references or records of the memory addresses of the second frame buffer memory space 245 in the third memory space 226. For example, the second application 159 may generate the second screen display image 262 and may instruct the GPU core 219 to generate the second image frame 243 representing the second screen display image 262. The screen display control module 163 may instruct the GPU core 219 to replace the pixel data of the second image frame 243 that should be written in the second frame buffer memory space 245 with the pixel data of the retained image section. The frame buffer 240 accordingly stores such a modified second image frame 243'. The display control core 223 subsequently retrieves the pixel data of the modified second image frame 243' from the frame buffer 240 and shows a modified second screen display image 262' at the display device 129. The second area 264 of the modified second screen display image 262' is the retained image section or the adjusted retained image section. The image sections at other areas of the modified second screen display image 262' are the image sections at the corresponding areas of the second screen display image 262. By doing so, the retained image section or the adjusted retained image section is always displayed at the second area 264 of a screen display image generated by one or more applications of the UE 110, while the screen display image may change frequently as instructed by the one or more applications. Therefore, a user may perceive that the retained image section or the adjusted is always on top of each of the screen display images shown at the display device 129.

In another configuration, after instructing the GPU core 219 to write the pixel data of the retained image section at the first frame buffer memory space 244 or second frame buffer memory space 245, the screen display control module 163 may further instruct the GPU core 219 or the memory controller 214 to protect the data stored in the first frame buffer memory space 244 or second frame buffer memory space 245. In other words, the data stored in the first frame buffer memory space 244 or second frame buffer memory space 245 may not be overwritten by the GPU core 219 as instructed by other applications. Therefore, the retained image section is displayed on the display device 129.

Further, the screen display control module 163 may provide an image release function that releases (discards) the retained image section (i.e., the pixel data and the first set of coordinates). An application may call the image release function through the API provided by the screen display control module 163. The screen display control module 163 may also provide a user interface that allows the user to call the image release function through the user interface.

In one technique, once the image release function is called, the screen display control module 163 stops instructing the GPU core 219 to display the retained image section and discards the retained image section stored in the third memory space 226. In another technique, the screen display control module 163 may further instruct the GPU core 219 or the memory controller 214 to stop protecting the data stored in the first frame buffer memory space 244 or second frame buffer memory space 245. In other words, the data stored in the first frame buffer memory space 244 or second frame buffer memory space 245 may be overwritten by the GPU core 219 as instructed by other applications.

Subsequently, the GPU core 219 may replace the pixel data of the retained image section stored at the first frame buffer memory space 244 or second frame buffer memory space 245 with the pixel data of the image section at the first area 254 or second area 264 of the second screen display image 262, respectively. In other words, the GPU core 219 displays the second screen display image 262 that is not modified. Consequently, the retained image section is no longer displayed "on top" of a screen display image shown on the display device 129.

In certain configurations, the screen display control module 163, using the techniques described supra, may allow a user or another program to specify one or more additional areas to be retained (i.e., in addition to the first area 254). The screen display control module 163 is also able to display the additionally retained areas always "on top" of the screen display images shown at the display device 129.

Figure 3:
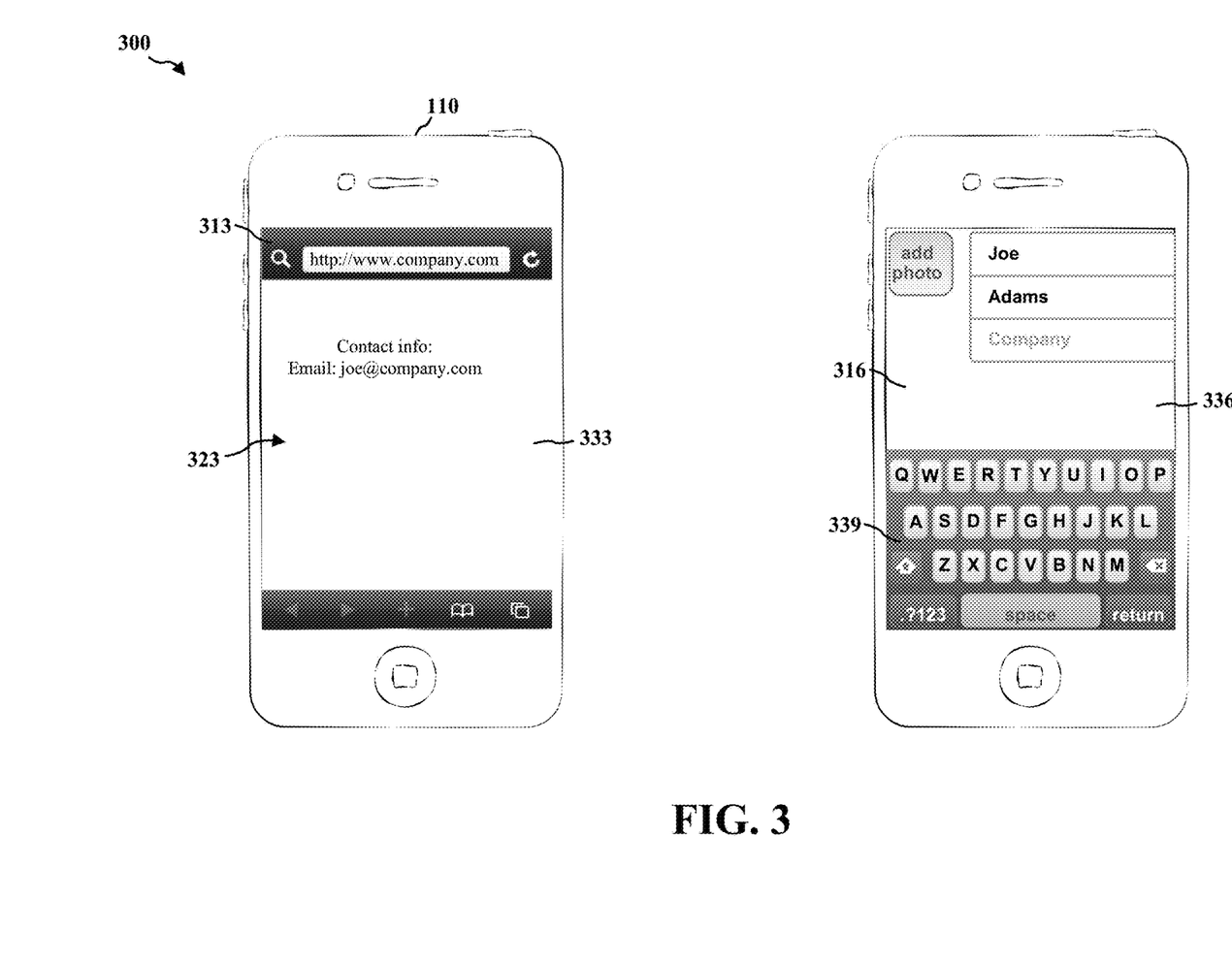
FIG. 3 is a diagram illustrating applications displaying screen display images on a UE.

FIG. 3 is a diagram 300 illustrating applications displaying screen display images on a UE. In this example, the first application 156 is a web browser program 313. The second application 159 is a contacts management program 316. The input device 126 and the display device 129 are a touch screen 323. The web browser program 313 is loaded into the first memory space 222 and executed by the CPU core 213. The web browser program 313 may generate a first screen display image 333. For example, the first screen display image 333 may include a webpage being accessed by the web browser program 313. The web browser program 313 then instructs the GPU core 219 to generate a corresponding image frame for displaying the first screen display image 333 on the touch screen 323. The GPU core 219 generates the image frame and writes the image frame to the frame buffer 240. The display control core 223 then transmits display signals to the touch screen 323 to display the first screen display image 333 on the touch screen 323. When displayed, the first screen display image 333 may occupy the entire display area of the touch screen 323.

The contacts management program 316 may generate a second screen display image 336. The contacts management program 316 instructs the GPU core 219 to generate a corresponding image frame for the second screen display image 336. The display control core 223 transmits display signals corresponding to the image frame to touch screen 323. When displayed, the second screen display image 336 may occupy the entire display area of the touch screen 323. For example, the second screen display image 336 may include contact information of a person. The second screen display image 336 may also include a soft keyboard 339, through which a user may input contact information. When a user touches the soft keyboard 339 on the touch screen 323, the contacts management program 316 may receive user inputs through the touch screen 323 (i.e., the input device 126).

Figure 4:
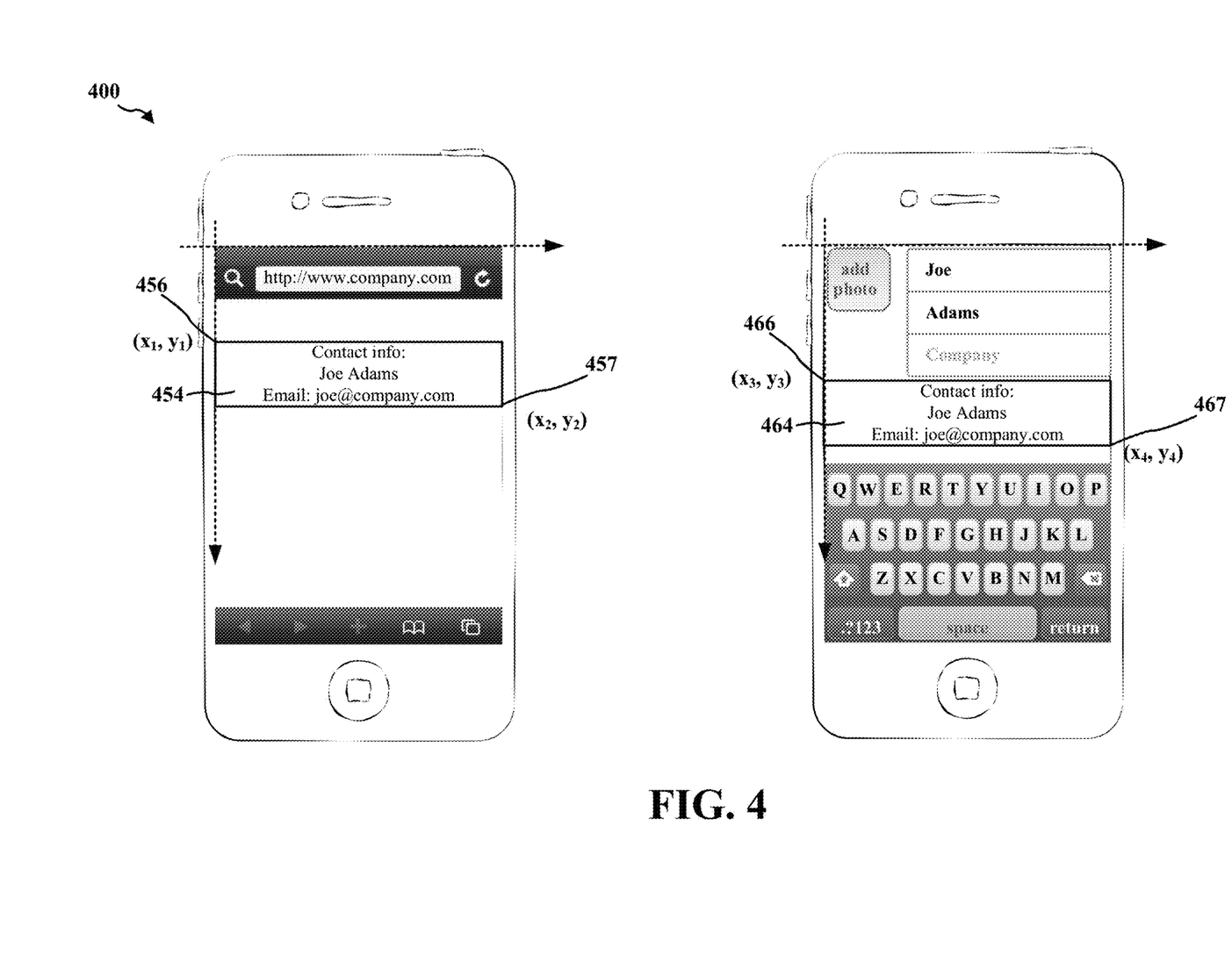
FIG. 4 is a diagram illustrating a UE displaying a retained image section.

FIG. 4 is a diagram 400 illustrating a UE displaying a retained image section. The web browser program 313 may display contact information of a person. A user of the UE 110 may want to enter the displayed contact information to the contacts management program 316. In one configuration, the image retain function of the screen display control module 163 may be invoked by pressing the touch screen 323 for a predetermined period of time. After the user has pressed the touch screen 323 for the predetermined period of time, the screen display control module 163 may provide a user interface that allows the user to draw a first rectangular box 454 (i.e., the first area 254) to select an image section to retain. In this example, the first rectangular box 454 surrounds the contact information displayed on the first screen display image 333. The screen display control module 163 further determines the first set of coordinates for the first rectangular box 454. In this example, the screen display control module 163 may obtain the coordinates of a first corner 456 and a second corner 457 diagonally opposite to the first corner 456. The coordinates of the first corner 456 are $(x_1, y_1)$. The coordinates of the second corner 457 are $(x_2, y_2)$. The image section in the first rectangular box 454 (i.e., the contact information image) is the retained image section. The screen display control module 163 stores the pixel data of the retained image section as well as the coordinates of the first corner 456 and second corner 457.

In this example, once the first rectangular box 454 is drawn, the image display function of the screen display control module 163 is also invoked. Thus, accordingly the screen display control module 163 may instruct the GPU core 219 to always display the retained image section at the first rectangular box 454 as described supra. Further, the screen display control module 163 may allow the user to drag the first rectangular box 454 to another location. As described supra, the screen display control module 163 may determine the locations of an adjusted first corner 466 and an adjusted second corner 467. The screen display control module 163 may determine that the coordinates of the adjusted first corner 466 are $(x_3, y_3)$ and that the coordinates of the adjusted second corner 467 are $(x_3, y_3)$. Accordingly, the screen display control module 163 may determine a second rectangular box 464 (i.e., the second area 264) to display the retained image section. Subsequently, the screen display control module 163 may send the pixel data of the retained image section and the coordinates of the second rectangular box 464 to the GPU core 219 and may instruct the GPU core 219 to always display the retained image section at the second rectangular box 464.

The user may now switch to the contacts management program 316, which instructs the GPU core 219 to display the second screen display image 336 with the soft keyboard 339 that allows the user to enter contact information. The GPU core 219, as instructed by the screen display control module 163, generates image frame of a modified second screen display image 336 that includes the retained image section at the second rectangular box 464. Thus, the user may perceive that the contact information image (i.e., the retained image section) is always on top of the second screen display image 336. Subsequently, the user may enter the contact information into the contacts management program 316 easily, as the user is able to see the contact information image at the same time while typing on the soft keyboard 339.

In this example, the image release function of the screen display control module 163 may be invoked by pressing the touch screen 323 for a predetermined time period while the image display function of the screen display control module 163 is running. Thus, once the user has done entering the contact information, the user may press the touch screen 323 for the predetermined time period to instruct the screen display control module 163 and/or the GPU core 219 to discard the retained image section. Accordingly, as described above, the screen display control module 163 and/or the GPU core 219 remove the pixel data and the second set of coordinates of the retained image section from the third memory space 226. The user sees that the contact information image disappears from the second screen display image 336.

Figure 5:
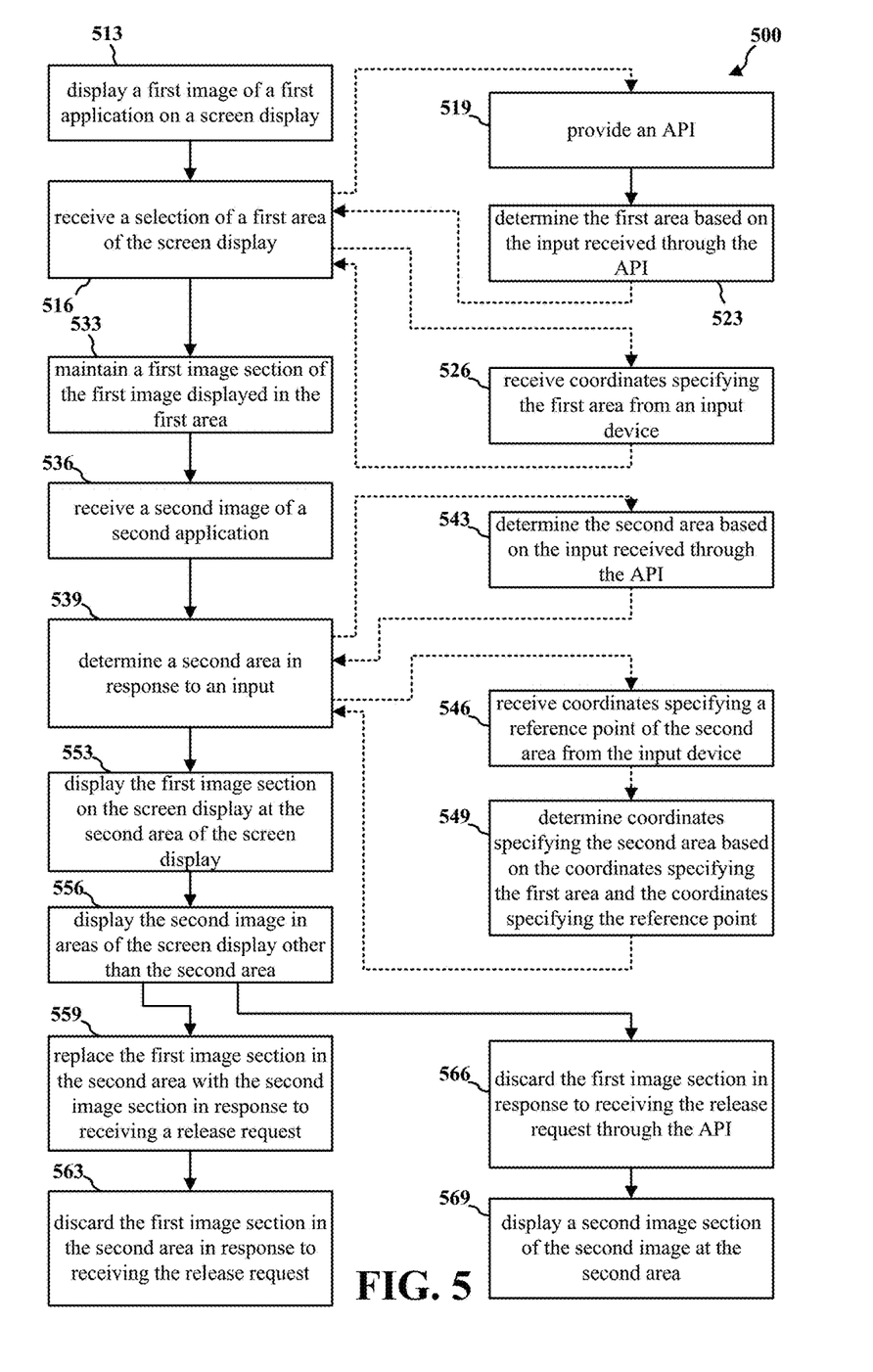
FIG. 5 is a flow chart illustrating a procedure for retaining an image section on a UE.

FIG. 5 is a flow chart 500 illustrating a procedure for retaining an image section on a UE. The procedure may be performed by a UE. The UE has a screen display. At operation 513, the UE displays a first image of a first application on the screen display. For example, referring to FIGS. 1 and 2, the first application 156 instructs the GPU core 219 to generate a corresponding first image frame 242 for displaying the first screen display image 252 on the display device 129. Referring to FIG. 3, the web browser program 313 may generate a first screen display image 333.

At operation 516, the UE receives a selection of a first area of the screen display. For example, referring to FIGS. 1 and 2, the screen display control module 163 may receive a user input specifying first set of coordinates through the input device 126. In one configuration, within operation 516, the UE may, at operation 519, provide an API. The API allows an application to specify the first area via an input. For example, referring to FIGS. 1 and 2, the screen display control module 163 may provide an API, through which the applications 156, 159 may call the functions of the screen display control module 163. The screen display control module 163 receives coordinates as parameters from another application calling the image retain function through the API provided by the screen display control module 163.

At operation 523, the UE may determine the first area based on the input received through the API. For example, referring to FIGS. 1 and 2, based on the first set of coordinates, the screen display control module 163 may determine the first area 254. In one configuration, within operation 516, the UE may, at operation 526, receive coordinates specifying the first area from an input device. For example, referring to FIGS. 1 and 2, the input device 126 may send a first set of coordinates corresponding to the first area 254 drawn by the user to the screen display control module 163.

Subsequent to operation 516, the UE, at operation 533, retains a first image section of the first image displayed in the first area. For example, referring to FIGS. 1 and 2, the screen display control module 163 may store the pixel data and the first set of coordinates in the third memory space 226. At operation 536, the UE receives a second image of a second application. For example, referring to FIGS. 1 and 2, the second application 159 may generate the second screen display image 262 and may instruct the GPU core 219 to generate the second image frame 243 representing the second screen display image 262.

At operation 539, the UE may determine a second area in response to an input. For example, referring to FIGS. 1 and 2, the screen display control module 163 may receive a user input that indicates the second area 264. In one configuration, the second area may be at a same location as the first area. For example, referring to FIGS. 1 and 2, after the image display function is called without parameters, each time the GPU core 219 refreshes the frame buffer 240 to write a second image frame 243 representing a second screen display image 262, the screen display control module 163 may use the pixel data and the first set of coordinates stored in the third memory space 226 and instruct the GPU core 219 to write the pixel data at the same first frame buffer memory space 244.

In one configuration, the second area is at a different location from the first area. In another configuration, the screen display control module 163 may be called with a second set of coordinates as parameters. For example, referring to FIGS. 1 and 2, the second set of coordinates specifies a second area 264 of the second screen display image 262. In one configuration, the input specifies a location of the second area. For example, referring to FIGS. 1 and 2, the screen display control module 163 may be called with a second set of coordinates as parameters. The second set of coordinates specifies a second area 264 of the second screen display image 262.

In one configuration, the API allows an application to specify the second area via an input. For example, referring to FIGS. 1 and 2, the second application 159 (or any other applications) may, when calling the image display function through the API, provide the second set of coordinates to the screen display control module 163 to instruct the screen display control module 163 where to display the retained image section. Within operation 539, the UE may, at operation 543, determine the second area based on the input received through the API. For example, referring to FIGS. 1 and 2, based on the second set of coordinates, the screen display control module 163 can determine the second area 264.

In one configuration, within operation 539, the UE may, at operation 546, receive coordinates specifying a reference point of the second area from the input device. At operation 549, the UE may determine coordinates specifying the second area based on the coordinates specifying the first area and the coordinates specifying the reference point.

Subsequent to operation 539, the UE, at operation 553, displays the first image section on the screen display at a second area of the screen display. For example, referring to FIGS. 1 and 2, the display control core 223 subsequently retrieves the pixel data of the modified second image frame 243' from the frame buffer 240 and shows a modified second screen display image 262' at the display device 129. The second area 264 of the modified second screen display image 262' is the retained image section or the adjusted retained image section. At operation 556, the UE displays the second image in areas of the screen display other than the second area. For example, referring to FIGS. 1 and 2, the image sections at other areas of the modified second screen display image 262' are the image sections at the corresponding areas of the second screen display image 262. In one configuration, the screen display may not include a second image section of the second image that corresponds to the second area.

In one configuration, subsequent to operation 556, the UE may, at operation 559, replace the first image section in the second area with the second image section in response to receiving a release request. For example, referring to FIGS. 1 and 2, the GPU core 219 may replace the pixel data of the retained image section stored at the first frame buffer memory space 244 or second frame buffer memory space 245 with the pixel data of the image section at the first area 254 or second area 264 of the second screen display image 262, respectively.

At operation 563, the UE may discard the first image section in the second area in response to receiving the release request. For example, referring to FIGS. 1 and 2, once the image release function is called, the screen display control module 163 stops instructing the GPU core 219 to display the retained image section and discards the retained image section stored in the third memory space 226.

In one configuration, the API allows the application to send a release request. For example, referring to FIGS. 1 and 2, an application may call the image release function through the API provided by the screen display control module 163. Subsequent to operation 556, the UE may, at operation 566, discard the first image section in response to receiving the release request through the API. At operation 569, the UE displays a second image section of the second image at the second area.

Figure 6:
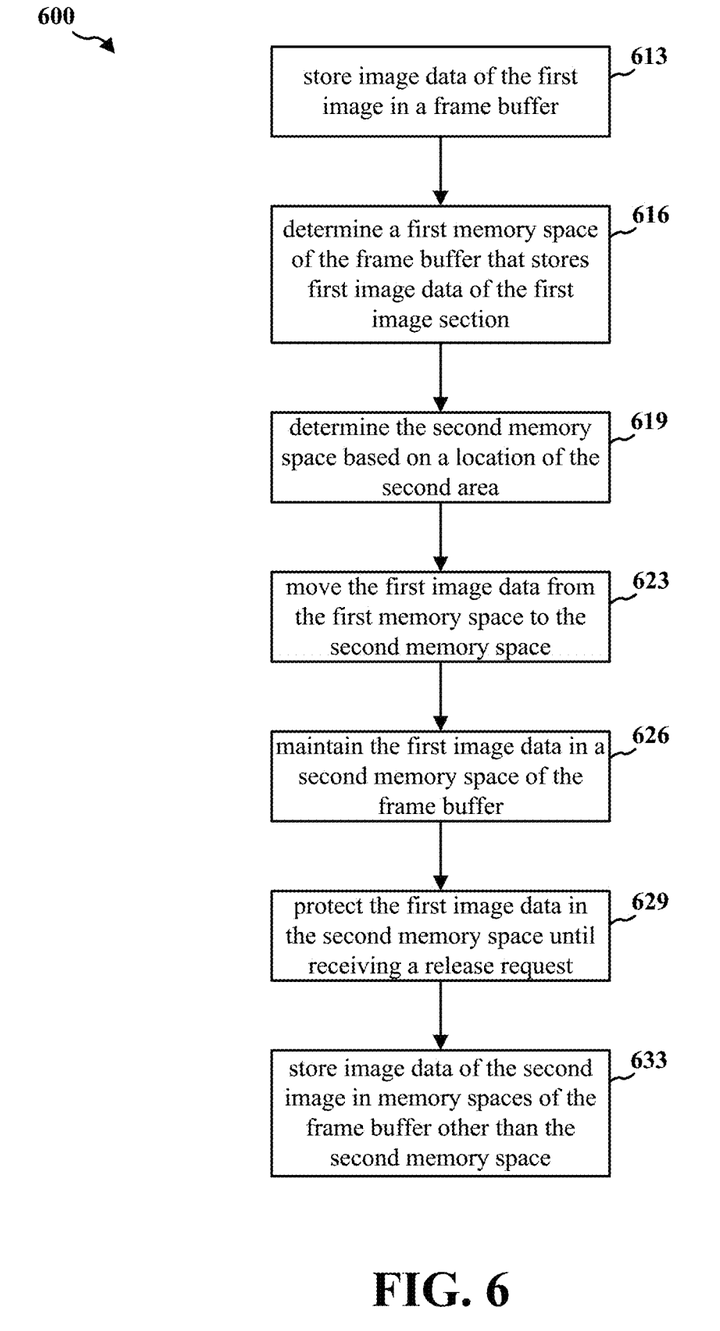
FIG. 6 is a flow chart illustrating a procedure for manipulating a memory space to retain an image section on a UE.

FIG. 6 is a flow chart 600 illustrating a procedure for manipulating a memory space to retain an image section on a UE. This procedure may be performed within operation 513, operation 516, operation 533, operation 536, operation 539, and operation 556 illustrate in FIG. 5. At operation 613, the UE may store image data of the first image in a frame buffer. Image data stored in the frame buffer specify an image being displayed at the screen display. For example, referring to FIGS. 1 and 2, the first application 156 generates the first screen display image 252 and instructs the GPU core 219 to write the first image frame 242 to the frame buffer 240 in order to display the first screen display image 252 on the display device 129.

At operation 616, the UE may determine a first memory space of the frame buffer that stores first image data of the first image section. For example, referring to FIGS. 1 and 2, the screen display control module 163 and/or the GPU core 219 may keep references or records of the memory addresses of the first frame buffer memory space 244 in the third memory space 226.

At operation 619, the UE may determine a second memory space based on a location of the second area. For example, referring to FIGS. 1 and 2, the screen display control module 163 and/or the GPU core 219 may keep references or records of the memory addresses of the second frame buffer memory space 245 in the third memory space 226.

At operation 623, the UE may move the first image data from the first memory space to the second memory space. For example, referring to FIGS. 1 and 2, the screen display control module 163, when performing the image retain function, may communicate with the GPU core 219 and retrieve the pixel data stored in the first frame buffer memory space 244. The screen display control module 163 may store the pixel data and the first set of coordinates in the third memory space 226. Subsequently, the GPU core 219 writes the pixel data at a second frame buffer memory space 245 that corresponds to the second area 264.

At operation 626, the UE may retain the first image data in the second memory space of the frame buffer. For example, referring to FIGS. 1 and 2, the screen display control module 163 may instruct the GPU core 219 to replace the pixel data of the second image frame 243 that should be written in the second frame buffer memory space 245 with the pixel data of the retained image section. The frame buffer 240 accordingly stores such a modified second image frame 243'.

At operation 629, the UE may protect the first image data in the second memory space until receiving a release request. For example, referring to FIGS. 1 and 2, the screen display control module 163 may further instruct the GPU core 219 or the memory controller 214 to protect the data stored in the first frame buffer memory space 244 or second frame buffer memory space 245. In other words, the data stored in the first frame buffer memory space 244 or second frame buffer memory space 245 may not be overwritten by the GPU core 219 as instructed by other applications.

At operation 633, the UE may store image data of the second image in memory spaces of the frame buffer other than the second memory space. In one configuration, the second memory space is the same as the first memory space. For example, referring to FIGS. 1 and 2, the screen display control module 163 may use the pixel data and the first set of coordinates stored in the third memory space 226 and instruct the GPU core 219 to write the pixel data at the same first frame buffer memory space 244.

In one configuration, an apparatus is provided with a screen display. The apparatus may be a UE. The apparatus includes means for displaying a first image of a first application on the screen display. The apparatus includes means for receiving a selection of a first area of the screen display. The apparatus includes means for retaining a first image section of the first image displayed in the first area. The apparatus includes means for receiving a second image of a second application. The apparatus includes means for displaying the first image section on the screen display at a second area of the screen display. The apparatus includes means for displaying the second image in areas of the screen display other than the second area.

The second area may be at a same location as the first area. The second area may be at a different location from the first area. The second image displayed may not include a second image section of the second image that corresponds to the second area.

The apparatus may include means for replacing the first image section in the second area with the second image section in response to receiving a release request. The apparatus may include means for discarding the first image section in the second area in response to receiving a release request.

The apparatus may include means for determining the second area in response to an input. The means for receiving the selection of the first area may be configured to receive coordinates specifying the first area from an input device. The means for the determining the second area may be configured to receive coordinates specifying a reference point of the second area from the input device. The means for the determining the second area may be configured to determine coordinates specifying the second area based on the coordinates specifying the first area and the coordinates specifying the reference point. The input may specify a location of the second area.

The apparatus may include means for providing an API. The API allows an application to specify at least one of the first area and the second area via an input. The apparatus may include means for determining the at least one of the first area and the second area based on the input received through the API. The API may allow the application to send a release request. The apparatus may include means for discarding the first image section in response to receiving the release request through the API. The apparatus may include means for displaying a second image section of the second image at the second area.

The apparatus may include means for storing image data of the first image in a frame buffer. The image data stored in the frame buffer specify an image being displayed at the screen display. The apparatus may include means for determining a first memory space of the frame buffer that stores first image data of the first image section. The apparatus may include means for retaining the first image data in a second memory space of the frame buffer. The apparatus may include means for storing image data of the second image in memory spaces of the frame buffer other than the second memory space. The apparatus may include means for determining the second memory space based on a location of the second area. The apparatus may include means for moving the first image data from the first memory space to the second memory space. The apparatus may include means for protecting the first image data in the second memory space until receiving a release request. The second memory space may be the same as the first memory space. The aforementioned means may be the screen display control module 163, the processor 210, the memory 116, the input device 126, the storage 133, the display device 129, and/or the system bus 211 configured to perform the functions corresponding to each of the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of operating a user equipment (UE) having a screen display, comprising:
   displaying a first image of a first application on the screen display;
   receiving a selection of a first area of the screen display by receiving coordinates specifying the first area, the first area of the screen display associated with a first image section of the first image;
   retaining the first image section of the first image displayed in the first area;
   receiving a second image of a second application;
   determining coordinates specifying a second area of the screen display based on the coordinates specifying the first area and coordinates specifying a reference point of the second area;
   displaying the first image section on the screen display at the determined coordinates specifying the second area of the screen display; and
   displaying the second image in areas of the screen display other than the second area.

2. The method of claim 1, wherein the second area is at a same location as the first area.

3. The method of claim 1, wherein the second area is at a different location from the first area.

4. The method of claim 1, comprising replacing the first image section in the second area with a second image section in response to receiving a release request.

5. The method of claim 1, comprising discarding the first image section in the second area in response to receiving a release request.

6. The method of claim 1, wherein the determining the coordinates specifying the second area is in response to an input.

7. The method of claim 6, wherein the determining the coordinates specifying the second area comprises:
   receiving the coordinates specifying the reference point of the second area from the input device.

8. The method of claim 6, wherein the input specifies a location of the second area.

9. The method of claim 1, comprising:
providing an application program interface (API), wherein the API allows an application to specify at least one of the first area and the second area via an input; and
determining the at least one of the first area and the second area based on the input received through the API.

10. The method of claim 9, wherein the API allows the application to send a release request, the method comprising:
discarding the first image section in response to receiving the release request through the API; and
displaying a second image section of the second image at the second area.

11. The method of claim 1, comprising:
storing image data of the first image in a frame buffer, wherein image data stored in the frame buffer specify an image being displayed at the screen display;
determining a first memory space of the frame buffer that stores first image data of the first image section;
retaining the first image data in a second memory space of the frame buffer; and
storing image data of the second image in memory spaces of the frame buffer other than the second memory space.

12. The method of claim 11, comprising:
determining the second memory space based on a location of the second area; and
moving the first image data from the first memory space to the second memory space.

13. The method of claim 11, comprising protecting the first image data in the second memory space by not overwriting the first image data in the second memory space until receiving a release request.

14. The method of claim 11, wherein the second memory space is the same as the first memory space.

15. An apparatus having a screen display, the apparatus being a user equipment (UE), comprising:
means for displaying a first image of a first application on the screen display;
means for receiving a selection of a first area of the screen display, wherein the means for receiving is further configured to receive coordinates specifying the first area, the first area of the screen display associated with a first image section of the first image;
means for retaining the first image section of the first image displayed in the first area;
means for receiving a second image of a second application;
means for determining coordinates specifying a second area of the screen display based on the coordinates specifying the first area and coordinates specifying a reference point of the second area;
means for displaying the first image section on the screen display at the determined coordinates specifying the second area of the screen display; and
means for displaying the second image in areas of the screen display other than the second area.

16. An apparatus having a screen display, the apparatus being a user equipment (UE), comprising:
a memory; and
at least one processor coupled to the memory and configured to:
display a first image of a first application on the screen display;
receive a selection of a first area of the screen display, wherein to receive the selection of the first area, the at least one processor is further configured to receive coordinates specifying the first area, the first area of the screen display associated with a first image section of the first image;
retain the first image section of the first image displayed in the first area;
receive a second image of a second application;
determine coordinates specifying a second area of the screen display based on the coordinates specifying the first area and coordinates specifying a reference point of the second area;
display the first image section on the screen display at the determined coordinates specifying the second area of the screen display; and
display the second image in areas of the screen display other than the second area.

17. The apparatus of claim 16, wherein the at least one processor is further configured to determine the coordinates specifying the second area in response to an input; wherein to determine the coordinates specifying the second area, the at least one processor is further configured to:
receive the coordinates specifying the reference point of the second area from the input device.

18. The apparatus of claim 16, wherein the at least one processor is further configured to:
provide an application program interface (API), wherein the API allows an application to specify at least one of the first area and the second area via an input, and wherein the API allows the application to send a release request;
determine the at least one of the first area and the second area based on the input received through the API;
discard the first image section in response to receiving the release request through the API; and
display a second image section of the second image at the second area.

19. The apparatus of claim 16, wherein the at least one processor is further configured to:
store image data of the first image in a frame buffer, wherein image data stored in the frame buffer specify an image being displayed at the screen display;
determine a first memory space of the frame buffer that stores first image data of the first image section;
retain the first image data in a second memory space of the frame buffer; and
store image data of the second image in memory spaces of the frame buffer other than the second memory space.

* * * * *